United States Patent
Paradis et al.

(10) Patent No.: US 7,236,861 B2
(45) Date of Patent: Jun. 26, 2007

(54) MISSION PLANNING SYSTEM WITH ASYNCHRONOUS REQUEST CAPABILITY

(75) Inventors: Rosemary D. Paradis, Vestal, NY (US); Robert J. Szczerba, Endicott, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 180 days.

(21) Appl. No.: 11/058,829

(22) Filed: Feb. 16, 2005

(65) Prior Publication Data
US 2006/0184291 A1  Aug. 17, 2006

(51) Int. Cl.
*G06F 17/00* (2006.01)
*G05D 1/00* (2006.01)

(52) U.S. Cl. .......................... 701/24; 701/120
(58) Field of Classification Search ............... None
See application file for complete search history.

(56) References Cited

U.S. PATENT DOCUMENTS

| | | | |
|---|---|---|---|
| 5,883,586 A | 3/1999 | Tran et al. | |
| 6,072,433 A | 6/2000 | Young et al. | |
| 6,122,572 A | 9/2000 | Yavnai | |
| 6,212,471 B1 | 4/2001 | Stiles et al. | |
| 6,259,988 B1 | 7/2001 | Galkowski et al. | |
| 6,493,609 B2 | 12/2002 | Johnson | |
| 6,584,382 B2 | 6/2003 | Karem | |
| 6,672,534 B2 | 1/2004 | Harding et al. | |
| 6,687,606 B1 | 2/2004 | Moitra et al. | |
| 6,718,261 B2 | 4/2004 | Mattheyses et al. | |
| 6,725,152 B2 | 4/2004 | Moitra et al. | |
| 6,904,335 B2 * | 6/2005 | Solomon | 700/247 |
| 6,990,406 B2 * | 1/2006 | Fink et al. | 701/117 |
| 2003/0158744 A1 | 8/2003 | Moitra et al. | |
| 2004/0007121 A1 | 1/2004 | Graves et al. | |
| 2004/0068351 A1 | 4/2004 | Solomon | |
| 2004/0068415 A1 | 4/2004 | Solomon | |
| 2004/0068416 A1 | 4/2004 | Solomon | |
| 2004/0078137 A1 | 4/2004 | Breakfield et al. | |
| 2004/0102876 A1 | 5/2004 | Doane | |
| 2004/0167682 A1 | 8/2004 | Beck et al. | |

FOREIGN PATENT DOCUMENTS

WO   WO9635982   11/1996

OTHER PUBLICATIONS

Parasuraman et al.; Human control of multiple robots in the RoboFlag simulation environment; Systems, Man and Cybernetics, 2003; IEEE; Oct. 2003; vol. 4, pp. 3232-3247.*

(Continued)

*Primary Examiner*—Michael J. Zanelli
(74) *Attorney, Agent, or Firm*—Tarolli, Sundheim, Covell & Tummino LLP

(57) ABSTRACT

A system processes asynchronous requests from members of a team of autonomous unmanned vehicles. The system includes a user request interface for receiving a request from a single team member and a request manager for performing a task in response to the request and returning a result of the task to the user request interface. The user request interface transfers the result to the single team member without communicating to any other members of the team.

20 Claims, 4 Drawing Sheets

OTHER PUBLICATIONS

Alighanbari et al.; Coordination and control of multiple UAVs with timing constraints and loitering; Proc. of the American Control Conf-Colo.; IEEE; Jun. 2003; pp. 5311-5316.*

Goldman et al.; Macbeth: a multi-agent constraint-based planner [autonomous agent tactical planner]; Digital Avionics Systems Conf, 2002; IEEE; Oct. 2002; vol. 2, pp. 7.E.3-1 to 7.E.3-8.*

Gordon-Spears et al.; Reconfigurable robot teams: modeling and supervisory control; IEEE Control Systems Tech; Sep. 2004; vol. 12, No. 5, pp. 763-769.*

Autonomous Mission Controller for High Autonomy Uninhabited Tactical Aircraft, Arie Yavnai.

An Information-Based Approach for System Autonomy Metrics Part I: Metrics Definition, Arie Yavnai.

Architecture of a Novel Mission Controller for Advanced Unmanned Air Vehicles, Arie Yavnai.

* cited by examiner

MISSION PLANNING SYSTEM WITH ASYNCHRONOUS REQUEST CAPABILITY

FIELD OF INVENTION

The present invention relates to a system for mission planning of unmanned vehicles and, more particularly, to a system for autonomously commanding and controlling a team of unmanned vehicles.

BACKGROUND OF THE INVENTION

A conventional system generates an initial plan at the beginning of a mission as a single long chain of steps. Each of the steps may be primitive items to be executed with no additional calculation. When changes in an environment or situation, which require a change of some steps in the initial plan, occur, the conventional system will be required to re-determine the entire plan from that point onward.

Replanning may require a relatively long period of time. In a time critical environment, replanning will ideally be performed quickly, before catastrophic situations may occur. Frequent, time-consuming replanning may bog down a planning and control system, leaving critical decisions to already overloaded human commanders.

Another conventional system may include conventional real-time tasking and classical shop scheduling. Conventional real-time task scheduling may be generally static and/or periodic and unable to request asynchronic and dynamic changes in requirements and resources. Conventional shop scheduling with deadlines may include stochastic and deterministic models. Conventional shop scheduling also requires time frames that may be minutes or hours. These conventional techniques are usually too computationally intensive for on-line resource management where a time frame is irregular, immediate, and spontaneous.

SUMMARY OF THE INVENTION

A system in accordance with the present invention processes asynchronous requests for members of a team of autonomous unmanned vehicles. The system includes a user request interface for receiving a request from a single team member and a request manager for performing a task in response to the request and returning a result of the task to the user request interface. The user request interface transfers the result to the single team member without communicating to any other members of the team.

Another system in accordance with the present invention processes asynchronous requests from members of a team of autonomous unmanned vehicles. The system includes a user request interface for receiving a request from a single team member, a request manager for performing a task in response to the request and returning a result of the task to the user request interface, and a vehicle request interface for providing instructions to members of the team in response to the request. The user request interface transfers the result to the single team member without communicating to any other members of the team.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF AN EXAMPLE EMBODIMENT

Figure 1:
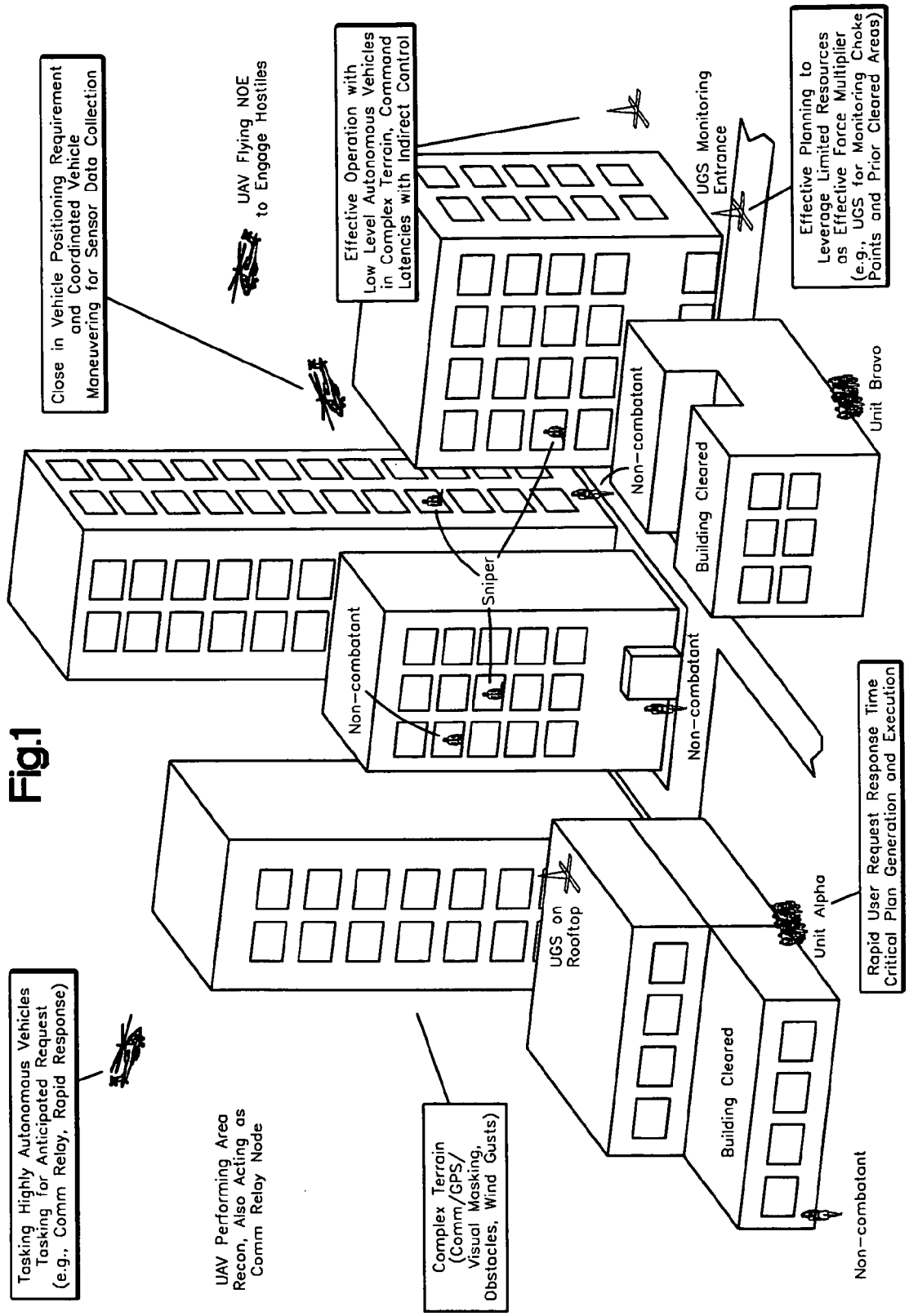
FIG. 1 is a schematic representation of an environment in which a system in accordance with the present invention may be utilized.

A system in accordance with the present invention utilizes state-of-the art components for cognitive reasoning and combines these components into a hierarchical planning system that may separate a plan or mission components into less complex sub-tasks. These subtasks may then be organized based on a deliberative method and/or a swarm method to execute mission tasks for each unmanned autonomous vehicle of a team of vehicles.

Conventional systems rely heavily on humans to prepare plans and monitor execution of the plans with some use of planning aids. Conventional systems typically utilize batch processes to plan, sense, and act. Batch processes require relatively long advance preparation time to determine a plan, based either on static or predicted feedback. There may be limited ability to perform complex, large dimension problems and to quickly refine or replan based on unfolding dynamic events that typically are the norm, rather than the exception, for most environments. By allowing asynchronous user requests, the system in accordance with the present invention may dynamically respond to the current environmental situations in an appropriate time frame with the most current information available. The system may contain a number of synergistic components that are designed to provide accurate and efficient resource allocation and dynamic mission planning capabilities for unmanned vehicles with varying levels of autonomy.

The system may support two different planning environments. The first environment may be a pre-mission planning environment with a commander performing planning steps. This pre-planning may require hours. The second environment may be an in-the-field environment with a warfighter requesting air-vehicle control tasking in matters of seconds. The requests for these tasks may be synchronous, in the case of regular status updates from sensors, vehicles, or users. The system may also process asynchronous requests thereby providing immediate attention and accommodating replanning in such a dynamic environment.

The system may control a team of autonomous vehicles operating in a desert, an ocean, or an urban environment, each having unique characteristics. Understanding the challenges of each environment, in particular an urban environment, may include recognition of obstacles such as high-rise buildings, friendly/hostile forces, etc. Climate considerations may also be considered while planning a mission. Some unique constraints to an urban environment may be proximity of obstacles and time constraints for enabling rapid decision-making and response planning for certain tasks.

Because of potential dangers to humans in a hazardous environment, an autonomous vehicle may enter an environment before a human. An autonomous vehicle may thus survey the environment and report back to a commander or decision maker the condition of the environment. Multiple autonomous vehicles, or teams of vehicles, may also perform this task to obtain a maximum amount of information in a given time.

The system may include multiple users, sensors, and vehicles, as well as a commander and several operators that may be authorizing and monitoring the system. Task requests from any user or vehicle may come into the system at different times, or at the same time. The system may process the asynchronous requests and generate plans for all the tasks, while optimizing the time and requirements for that plan. At that point, a contingency management component may analyze new requests, and a plan change may occur during the execution of the current plan. This dynamic plan modification may allow the system to respond to any new requests or changes from the current mission plan.

Military operations in hostile and constantly changing environments, more commonly known as battle theatres, are complex and dangerous for a warfighter. The flexible mission planning system of the present invention accounts for such environments.

Key goals for the system may be: (1) improvement of support for the warfighters in the environment; (2) providing efficient means for commanders to plan missions; and (3) providing commanders with a capability for plan monitoring and real-time refinements of plan execution.

The mission planning and control system for unmanned autonomous vehicles may provide a tool for reducing the risk to, and improving the effectiveness of, forces operating in any environment, including the more complex urban environment. FIG. 1 shows an example environment with some of the challenges present in an urban environment. The callout boxes in FIG. 1 highlight the planning and control challenges associated with an example urban Reconnaissance, Surveillance, and Target Acquisition (RSTA) mission.

An example mission may comprise a number of human units and a warfighter. In urban environments, the human units encounter a high risk of exposure to sniper fire. The environment may be an Innercity Urban Terrain Zone (IUTZ). The objective of the human units is to clear the zone of hostiles. The warfighter may request current imagery in advance of its intended route, with particular interest in rooftop and open windows with line of sight to a near term route. The warfighter may also request updates on which buildings have been cleared in a local area. The human units may have sensors and UAV's collecting imagery of buildings, windows, and thoroughfares. The human units also may deposit Unattended Ground Sensors (UGS) at key entrances to buildings for monitoring access points to already cleared buildings, as well as at corners of rooftops with good lines of visibility to neighboring buildings and intersections. Another UAV with more advanced capabilities may sweep the IUTZ to provide wider area coverage, communication relay, and rapid response to unforeseen hostilities or other changes to the IUTZ.

The mission planning and control system for unmanned autonomous vehicles may have a wide range of, not only unmanned vehicles, but also human warfighters that may complete tasks in order to meet mission objectives. The system's adaptability allows considerations of the different capabilities of the unmanned vehicles and the human units. This situation provides any system with a complexity challenge for time-critical responses.

The system in accordance with the present invention may orchestrate the activities of multiple vehicles, insuring effective and safe operation, with minimal interference to mission plan execution. Thus, the system facilitates the most effective operation of each unmanned vehicle in executing its assigned tasks.

The availability of many types of sensors, vehicles, and teams enables the system to maximize synergy among a team of unmanned vehicles in achieving results of higher quality, greater reliability, and/or greater speed than would be available by independently tasking of the same set of unmanned vehicles. Further, this system may task a team of multiple autonomous unmanned vehicles having varying levels of autonomy.

The system may task multiple teams of unmanned vehicles at a team-to-team level, thereby reducing complexity and accelerating new mission plan generation. The system may task heterogeneous unmanned vehicles thereby exploiting synergy among diverse vehicle capabilities. The system may form/reform teams dynamically thereby allowing continuity of mission plan execution in the face of changing assets and resources.

Users, or agents, of the system have the capability to asynchronously read from, write to, and/or control transfer of data to multiple vehicles and sensors. The system may manage queues of asynchronous user requests that may affect multiple vehicles. The system may further service some of these requests. The system may have a distributed infrastructure providing the capability for each component to make requests to, and receive responses from, from other components that are capable of such communication. This allows for component polymorphism so that there may be no dependency on a specific implementation of a component, only on a correct implementation of the component's interface.

Conventional real-time task scheduling is generally static and/or periodic and cannot process asynchronous requests or dynamic changes in requirements and/or resources. Conventional shop scheduling may include stochastic and deterministic models with time frames in minutes to hours. These conventional techniques are typically computationally intensive for on-line resource management where the response time requirement is much more constrained. Asynchronous user requests allowed by the system in accordance with the present invention provides for dynamic application of computational resources to activities or agents, while at the same time adapting to changes in the plan or physical environment (i.e., sensor reports, updated operator preferences or modified mission goals, changes in processing capability, overloads, failures, etc.).

In order to plan a mission with the capability to use multiple vehicles with varying levels of autonomy, the system requires information about a commander's intent for the mission, the mission plan, and the types of vehicles that will be available for a particular mission. In order to accomplish a task, the system may view all vehicle capabilities, and optimize what functions each vehicle, or group of vehicles is performing for the success of the mission. The vehicle or vehicles that are chosen to execute a particular task may be dynamic.

For example, a certain number of vehicles may start out in a team of vehicles performing a task based on their capabilities and availability. However, if a vehicle is lost, destroyed, or called out to participate in another mission, the system may task other vehicles, whose capabilities may not be as optimal as those initially selected, to perform the remaining task.

Two conventional paradigms typically control design of multi-agent systems, a deliberative agent paradigm with central control and a swarm paradigm having simple agents and distributed control. The system in accordance with the present invention may utilize a hybrid of these two paradigms. The flexibility to utilize either paradigm may be controlled by an operator/commander in the initial plan composition, or by the system itself.

Some autonomous vehicles may have many intelligent features, such as the ability to reason, negotiate, and plan action. Complex tasks may be executed either individually or collaboratively with teams of these vehicles. If collective behavior is required, in a deliberative environment, then the system (i.e., a central controller) may coordinate group behavior.

The system may monitor capabilities and the state of each vehicle, and determine which agent should be used for a particular task. In some cases, with some of the vehicles having higher levels of autonomy, collaboration between vehicles may be achieved without central control of the system (i.e., these vehicles are capable of knowing the capabilities and states of the other vehicles, etc.).

The system may form a group of lower capability vehicles into a swarm organization. In this case, the system may not direct the behavior of the swarm of vehicles, rather a collective behavior may emerge from local interactions between the vehicles and the environment. Swarms may offer several advantages over a traditional paradigm based on the deliberative vehicles with central control. Swarms may be robust and flexible enough to modify behavior based on changing environmental and team conditions.

Swarms may also be somewhat more scalable and adaptable—increasing the number of vehicles in the swarm or tasks performed by the swarm. Also, lower capability vehicles may be less likely to fail than higher capability vehicles. Further, if lower capability vehicles fail, they may be easily replaced with another vehicle that requires little information to begin operation.

Central control of the system may create a high volume of communication and computation required to perform a task and keep all vehicles aware of required information. Combining the deliberative agent paradigm and the swarm paradigm may minimize communication costs, while still controlling the effect that individual characteristics of the vehicles may have on collective behavior of the system as a whole.

However, requests generated from this combination may still have common characteristics. The distribution of resources may be resolved by adaptively maximizing total user quality of service according to application and situation specific criteria. This adaptation may require time-critical orchestration of sensors, weapons, data links, etc.

This system may process synchronous user requests, as well as asynchronous user requests. Synchronous user requests may consist of events that occur on a scheduled basis, such as reporting of sensor data from vehicles and UGSs, status check-ins of users and vehicles, satisfactory completion indicators from vehicles or users of assigned regular tasks, etc. Asynchronous user requests may include all other unscheduled communication from users, vehicles, sensors, operators, and/or commanders. Asynchronous user requests may first be queued locally so that a request-receiving agent may continue to receive other user requests. The system may implement a "threading" model with a "thread" created to process each user request. When a request is made by a user, a thread may be "spawned" to service that request and control a return to a main thread. A child thread may execute a blocking I/O in that user request, but another thread may be processed simultaneously. The main thread may check for completion or request notification of completion.

Figure 2:
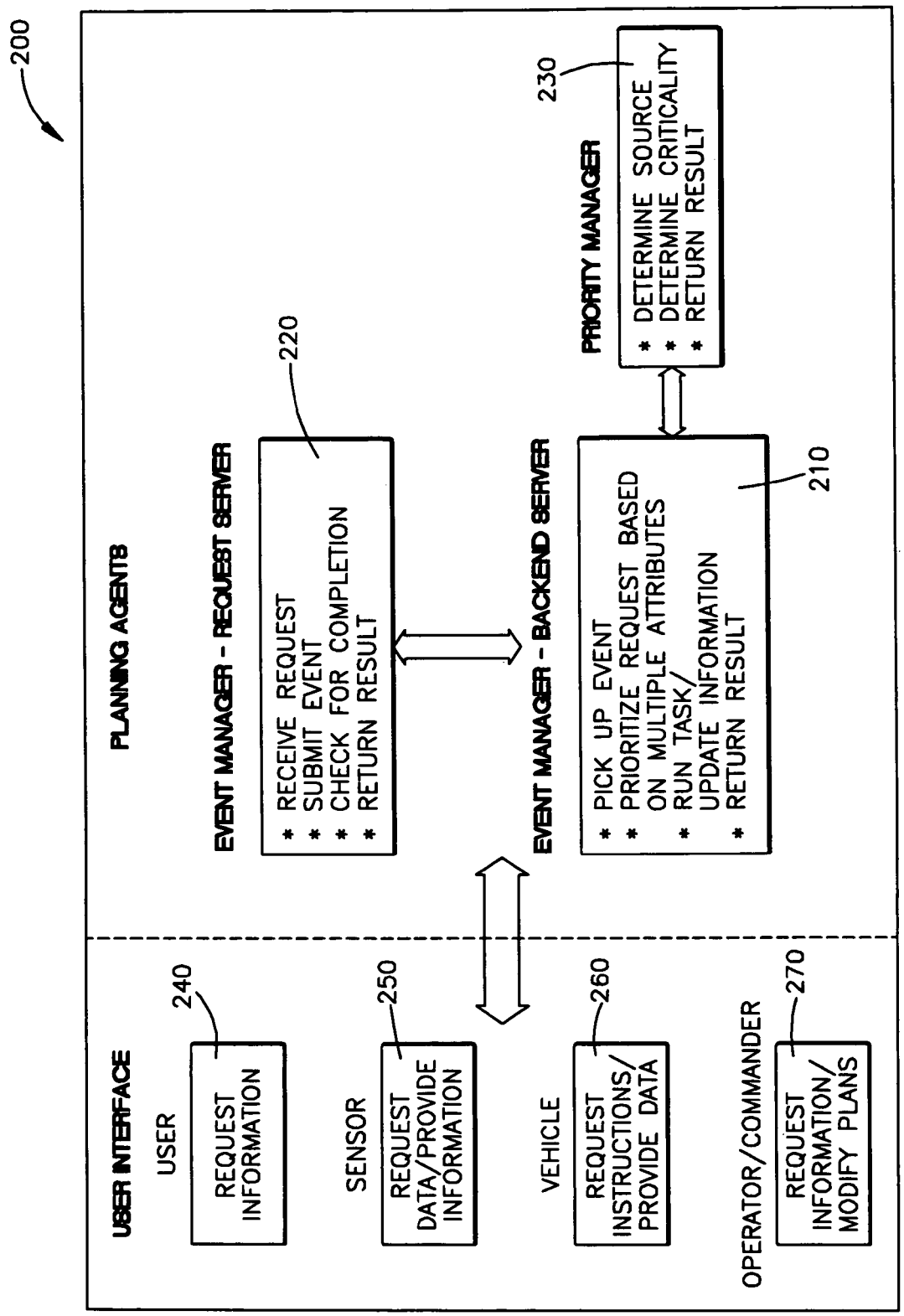
FIG. 2 is a schematic representation of an example system in accordance with the present invention.

All asynchronous user requests may be executed in the order of receipt, unless priority is determined externally. As shown in FIG. 2, an example system 200 may process each user request from a local queue. The example system 200 may include an Event Manager-Backend Server 210, an Event Manager-Request Server 220, a Priority Manager 230, a User Interface 240, a Sensor Interface 250, a Vehicle Interface 260, and an Operator/Commander Interface 270. The user request may be sent to an Event Manager-Backend Server 210, which may determine priority of the request and reorder tasks in a queue based on priority.

If the system receives a synchronous user request subsequent to receipt of several asynchronous user requests, the synchronous user request may be executed as soon as possible. Asynchronous user requests for a particular item may be processed subsequent to synchronous user requests for that item, unless priority of the asynchronous user request is predetermined higher than a default synchronous request priority. In this manner, status updates may be executed before priority determinations, unless the asynchronous user request may be processed without a status update.

Each user request has multiple dimensions, such as time, availability, capability, etc. Distribution of resources determines quality of service to users and success of the mission. Some service requests may not be perfectly satisfied. Adaptive situation/application specific resource management may be required. Some user requests may be dependent on capabilities of the user, sensor, or vehicle. Some user requests may be time critical—quality of service depends on when the service is executed. Further, timeliness of the service may have a great impact on the system and the mission.

For example, numerous user requests may enter the system at a time when computation power is being utilized for planning. This may overload the system. However, the goal of the system in this case is maintain control of the planning environment using predefined resolution criteria. During overload, a data processing order may be based on relative request utility. The utility of a request may be based on criteria that will satisfy dependencies, such as resource constraints, criticality of the operation, etc. These criteria may include an amount of recent sensor data that has been received, accuracy of the data in relation to the user request, and importance of the user request that may be user or operator identified based.

The system may have a modifiable order of preference for user requests, such as user identified important requests receiving preference, user identified important geographical areas receiving preference; potentially high threat user requests receiving preference, high speed vehicle user requests receiving preference, etc. This ordering may change and may be based on mission theatre.

Figure 3:
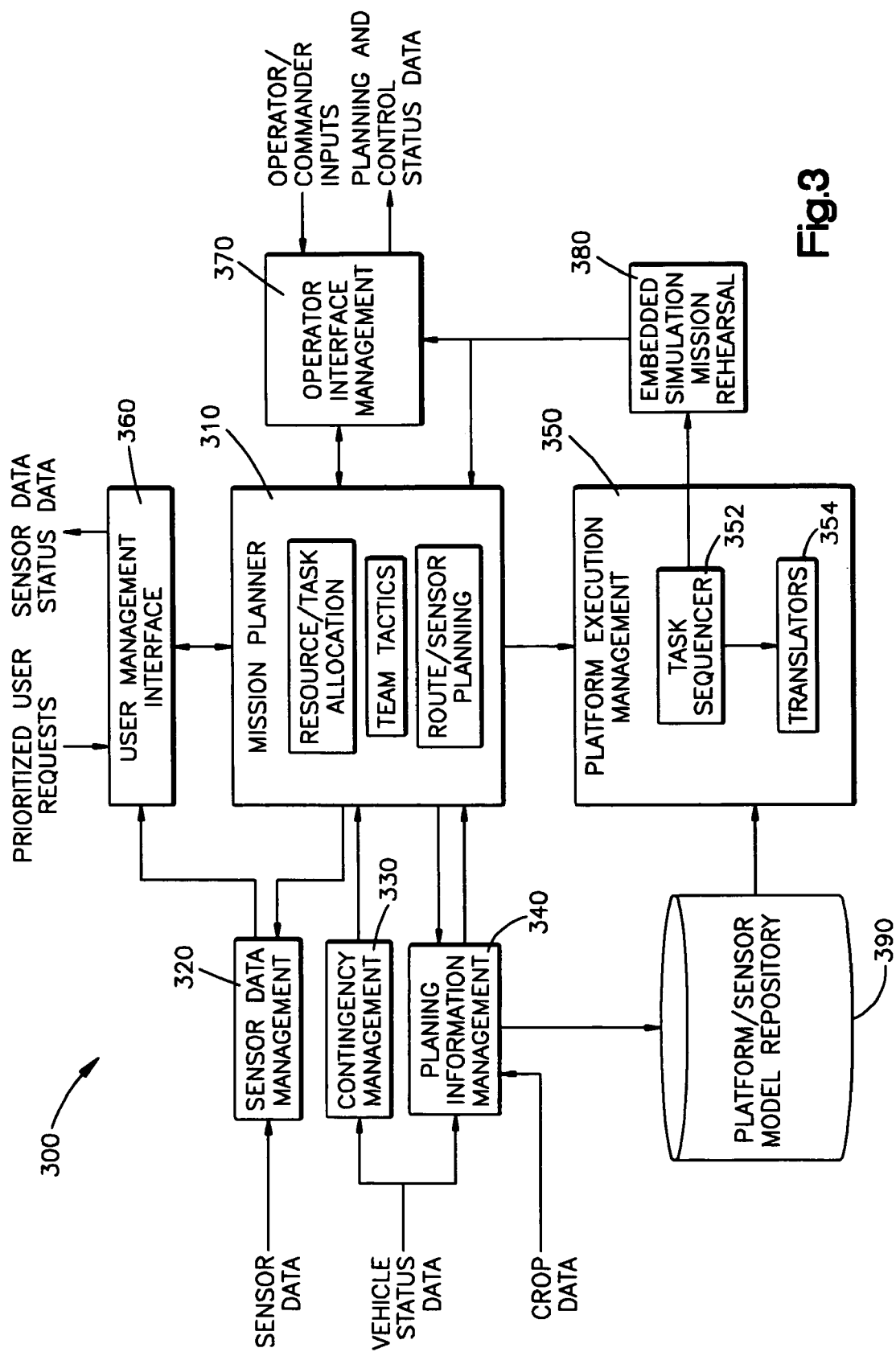
FIG. 3 is a schematic representation of another example system in accordance with the present invention.

In order to control a team of unmanned vehicles with varying levels of autonomy, an example system 300 in accordance with the present invention may include a number of synergistic functional components designed to provide accurate and efficient resource allocation and dynamic mission planning capability. As shown in FIG. 3, such components may include a Mission Planner 310, a Sensor Data Manager 320, a Contingency Manager 330, a Planning Information Manager 340, a Planning Execution Manager 350, a User Interface Manager 360, an Operator Interface Manager 370, an Embedded Simulator 380, a Platform/Sensor Model Repository 390, etc.

The Mission Planner 310 may determine an optimal resource allocation and tasking in response to asynchronous user requests. The Sensor Data Manager 320 may coordinate, schedule, and optimize the distribution of received sensor data to the various users in response to asynchronous user requests.

The Contingency Manager 330 may autonomously monitor the status of mission execution from the health and status of the individual vehicles, the status of individual plans, to the status of the collaborative mission plan. The Planning Information Manager 340 may extract information from actual mission plans, as well as external resources, and translate the information into a necessary format to be used by the other mission planning components. The Platform Execution Manager 350 may enable a planned mission to be evaluated, simulated, and detailed through tasking of various vehicle platforms. This may include the use of data from the Platform Modeling Repository 390, a Task Sequencer 352, a Vehicle Platform Translator 354, and links to the Embedded Simulator 380 for plan assessment and mission rehearsal.

The User Interface Manager 360 may provide the interface between the system 300 and an end user in the field. For example, multiple users may asynchronously task the system 300 for a variety of requests.

The Operator Interface Manager 370 may provide an interface between the system 300 and an operator. An operator (i.e., a commander, etc.) may input instructions and/or high-level mission constraints. Additionally, an operator may monitor execution of the mission plan and intercede at any level of the planning hierarchy, if desired.

The Embedded Simulator 380 may provide a realistic simulation model to evaluate candidate plans, produce performance metrics, and/or provide feedback to an operator and/or mission commander for plan refinement and mission rehearsal.

The Platform/Sensor Model Repository 390 may store realistic models used for various platforms and sensors in a mission environment. The Repository 390 may generally be populated from outside the system 300, but maintained within the system.

Human interaction with an autonomous system may propose a challenge. Workload may be shared between human and intelligent technology, or if not shared, monitored by humans that may change execution of any event or task via a user request. Typically, a user request may be high priority and may supercede a current task ranking. This joint participation of a human and an intelligent system may require communication regarding goals, abilities, and/or responsibilities (i.e., a mixed-initiative dialogue). A mixed-initiative system may integrate human and automated reasoning, combining respective reasoning styles and computational strengths. A benefit of such a system may be a combination of resources available to humans and automated components. The system may achieve the objective of managing interaction and responsibilities required for joint decision-making.

The system may thus process asynchronous user/task requests. There may not be a defined thread to be completed before a next thread is initiated. Instead, a more dynamic reasoning system may be utilized for processing user requests in the constantly changing environment of a typical military mission. Expectations for a human user may be ease of giving and receiving information, as well as predictable behavior of the system and vehicles of the system.

The system may allow specification of goals and actions at non-uniform intervals and cooperative operation with human users and operators involved with the mission. Asynchronous request capability may support productive cooperation between users, an operator, vehicles, and/or the system itself such that information may be shared for planning and execution of mission tasks. This cooperation between an operator and the system may largely be non-scriptable and require highly intelligent, robust behavior from the system in cooperation with users. The system thus allows adaptability to new user requests and the ability to be reactive and responsive to user and vehicle requests.

Figure 4:
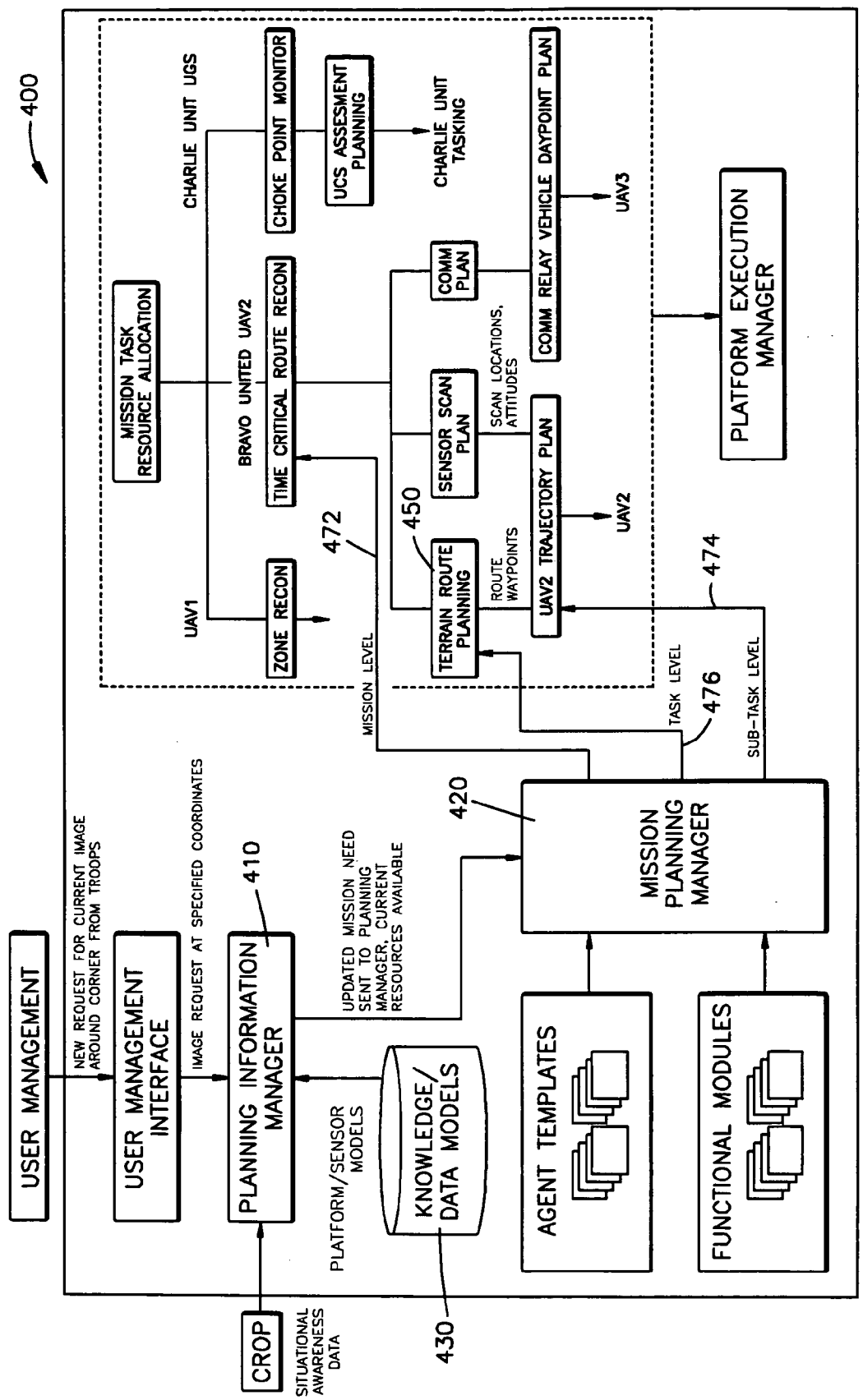
FIG. 4 is a schematic representation of another example system in accordance with the present invention.

FIG. 4 shows an example system 400 in accordance with the present invention. The system may include A Planning Information Manager 410, a Mission Planning Manager 420, a Terrain Route Planner 450, etc. A new task may be read by the Planning Information Manager 410, which may update planning objective functions stored in a knowledge Repository 430 and also may send a notification of the new request to the Mission Planning Manager 420. The Mission Planning Manager 420 may then determine if an existing planning agent may be modified or if a new agent should be created. The Mission Planning Manager 420 also may coordinate mapping of the input requests to the appropriate level of the planning hierarchy, attempting to respond at the lowest level to avoid unnecessary replanning activity at a higher mission level (i.e., unnecessarily recomputing team composition and assigned reconnaissance area zones, etc.). In this example, the Mission level 472 and Sub Task level 474 paths are not chosen; rather, the Task level 476 path to the Terrain Route Planner 450 is selected to add an extra waypoint in a vehicle route.

If the system receives multiple requests after a first request is initiated, other dynamic tasking agents may be concurrently initiated. The system may have information regarding relative importance of the request, operator or commander priority of such a request, and/or time criticality for request completion. Prior to execution of a task, a task-planning agent may confer with a team tactics agent and a route and sensor planning agent to schedule time critical information and contingency information. A task sequencing agent may then be initiated through a cyclical method for optimization of utility function for optimization of timing of the requests (i.e., "in-time" for satisfaction of the requests).

In order to provide a context for the various aspects of the present invention, the following discussion is intended to provide a brief, general description of a suitable computing environment in which the various aspects of the present invention may be implemented. While the invention has been described above in the general context of computer-executable instructions of a computer program that runs on a computer, those skilled in the art will recognize that the invention also may be implemented in combination with other program modules.

Generally, program modules include routines, programs, components, data structures, etc. that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications argument model. However, some, if not all aspects of the invention can be practiced on stand-alone computers. In a distributed computing environment, program modules may be located in both local and remote memory storage devices.

An exemplary system for implementing the various aspects of the invention includes a conventional server computer, including a processing unit, a system memory, and a system bus that couples various system components including the system memory to the processing unit. The processing unit may be any of various commercially available processors. Dual microprocessors and other multiprocessor architectures also can be used as the processing unit. The system bus may be any of several types of bus structure including a memory bus or memory controller, a peripheral bus, and a local bus using any of a variety of conventional bus architectures. The system memory includes read only memory (ROM) and random access memory (RAM). A basic input/output system (BIOS), containing the basic routines that help to transfer information between elements within the server computer, such as during start-up, is stored in ROM.

The server computer further includes a hard disk drive, a magnetic disk drive, e.g., to read from or write to a removable disk, and an optical disk drive, e.g., for reading a CD-ROM disk or to read from or write to other optical media. The hard disk drive, magnetic disk drive, and optical disk drive are connected to the system bus by a hard disk drive interface, a magnetic disk drive interface, and an optical drive interface, respectively. The drives and their associated computer-readable media provide nonvolatile storage of data, data structures, computer-executable instructions, etc., for the server computer. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM, including an operating system, one or more application programs, other program modules, and program data. A user may enter commands and information into the server computer through a keyboard and a pointing device, such as a mouse. Other input devices (not shown) may include a microphone, a joystick, a game pad, a satellite dish, a scanner, or the like. These and other input devices are often connected to the processing unit through a serial port interface that is coupled to the system bus, but may be connected by other interfaces, such as a parallel port, a game port or a universal serial bus (USB). A monitor or other type of display device is also connected to the system bus via an interface, such as a video adapter. In addition to the monitor, computers typically include other peripheral output devices (not shown), such as speaker and printers.

The server computer may operate in a networked environment using logical connections to one or more remote computers, such as a remote client computer. The remote computer may be a workstation, a server computer, a router, a peer device or other common network node, and typically includes many or all of the elements described relative to the server computer. The logical connections include a local area network (LAN) and a wide area network (WAN). Such networking environments are commonplace in offices, enterprise-wide computer networks, intranets and the internet.

When used in a LAN networking environment, the server computer is connected to the local network through a network interface or adapter. When used in a WAN networking environment, the server computer typically includes a modem, or is connected to a communications server on the LAN, or has other means for establishing communications over the wide area network, such as the internet. The modem, which may be internal or external, is connected to the system bus via the serial port interface. In a networked environment, program modules depicted relative to the server computer, or portions thereof, may be stored in the remote memory storage device. It will be appreciated that the network connections shown are exemplary and other means of establishing a communications link between the computers may be used.

In accordance with the practices of persons skilled in the art of computer programming, the present invention has been described with reference to acts and symbolic representations of operations that are performed by a computer, such as the server computer, unless otherwise indicated. Such acts and operations are sometimes referred to as being computer-executed. It will be appreciated that the acts and symbolically represented operations include the manipulation by the processing unit of electrical signals representing data bits which causes a resulting transformation or reduction of the electrical signal representation, and the maintenance of data bits at memory locations in the memory system (including the system memory, hard drive, floppy disks, and CD-ROM) to thereby reconfigure or otherwise alter the computer system's operation, as well as other processing of signals. The memory locations where such data bits are maintained are physical locations that have particular electrical, magnetic, or optical properties corresponding to the data bits.

The presently disclosed embodiments are considered in all respects to be illustrative, and not restrictive. The scope of the invention is indicated by the appended claims, rather than the foregoing description, and all changes that come within the meaning and range of equivalence thereof are intended to be embraced therein.

We claim:

1. A system for processing asynchronous requests from members of a team of autonomous unmanned vehicles, said system comprising:
    a user request interface for receiving a request from a single team member; and
    a request manager for performing a task in response to the request and returning a result of the task to said user request interface,
    said user request interface transferring the result to the single team member without communicating to any other members of the team.

2. The system as set forth in claim 1 further including a mission planning manager for determining an appropriate level of a team hierarchy to input the request.

3. The system as set forth in claim 1 further including a planning information manager for receiving requests to update objectives of a mission plan for the team of autonomous unmanned vehicles.

4. The system as set forth in claim 1 further including a mission task resource allocator for determining resources utilized by the team for executing a mission plan.

5. The system as set forth in claim 1 further including a contingency manager for monitoring execution of a mission plan by the team.

6. The system as set forth in claim 5 further including a mission planner for executing changes to the mission plan.

7. The system as set forth in claim 1 further including a priority manager for determining criticality of the request.

8. The system as set forth in claim 7 wherein said priority manager determines a source of the request.

9. The system as set forth in claim 8 wherein said priority manager returns a result to said request manager.

10. The system as set forth in claim 1 further including an operator request interface for receiving a request to modify a mission plan from an operator of said system.

11. A system for processing asynchronous requests from members of a team of autonomous unmanned vehicles, said system comprising:
   a user request interface for receiving a request from a single team member;
   a request manager for performing a task in response to the request and returning a result of the task to said user request interface; and
   a vehicle request interface for providing instructions to members of the team in response to the request,
   said user request interface transferring the result to the single team member without communicating to any other members of the team.

12. The system as set forth in claim 11 further including a mission planning manager for transmitting an update to a mission task resource allocator.

13. The system as set forth in claim 11 further including a mission planning manager for transmitting an update to a choke point monitor.

14. The system as set forth in claim 11 further including a mission planning manager for transmitting an update to a terrain route planner.

15. The system as set forth in claim 11 further including a mission planning manager for transmitting an update to a trajectory planner.

16. The system as set forth in claim 11 further including an embedded simulator for modeling a candidate mission plan.

17. The system as set forth in claim 11 further including a repository for storing realistic models.

18. The system as set forth in claim 11 further including an operator interface manager f or monitoring execution of a mission plan.

19. The system as set forth in claim 11 further including a platform execution manager for evaluating a mission plan.

20. The system as set forth in claim 19 wherein said platform execution manager has a task sequencer and a vehicle platform translator.

* * * * *